US011012676B2

(12) United States Patent
Kvaalen

(10) Patent No.: US 11,012,676 B2
(45) Date of Patent: May 18, 2021

(54) METHODS, SYSTEMS, AND MEDIA FOR GENERATING AND RENDERING IMMERSIVE VIDEO CONTENT

(71) Applicant: Google LLC, Mountain View, CA (US)

(72) Inventor: Samuel Kvaalen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/840,361

(22) Filed: Dec. 13, 2017

(65) Prior Publication Data
US 2019/0182468 A1 Jun. 13, 2019

(51) Int. Cl.
*H04N 13/122* (2018.01)
*G06T 15/20* (2011.01)
(Continued)

(52) U.S. Cl.
CPC .......... *H04N 13/122* (2018.05); *G06T 7/593* (2017.01); *G06T 15/205* (2013.01); *H04N 5/23238* (2013.01); *H04N 13/128* (2018.05); *H04N 13/194* (2018.05); *H04N 13/271* (2018.05); *H04N 13/275* (2018.05);
(Continued)

(58) Field of Classification Search
CPC .. H04N 13/122; H04N 13/275; H04N 13/128; H04N 13/271; H04N 13/257; H04N 13/261; H04N 13/194; H04N 13/279; H04N 13/282; H04N 5/23238; H04N 21/2343; H04N 13/296; G06T 7/593; G06T 15/205
See application file for complete search history.

(56) References Cited

U.S. PATENT DOCUMENTS 7,978,931 B2 * 7/2011 Pan .......................... G06K 9/32
382/154
9,369,689 B1 * 6/2016 Tran ....................... G06T 7/593
(Continued)

FOREIGN PATENT DOCUMENTS

CN 102938844 2/2013
JP 2005201926 7/2005
(Continued)

OTHER PUBLICATIONS

International Search Report and Written Opinion dated Dec. 18, 2018 in International Patent Application No. PCT/US2018/051072.
(Continued)

*Primary Examiner* — Nhan T Tran
(74) *Attorney, Agent, or Firm* — Byrne Poh LLP

(57) ABSTRACT

Methods, systems, and media for generating and rendering immersive video content are provided. In some embodiments, the method comprises: receiving information indicating positions of cameras in a plurality of cameras; generating a mesh on which video content is to be projected based on the positions of the cameras in the plurality of cameras, wherein the mesh is comprised of a portion of a faceted cylinder, and wherein the faceted cylinder has a plurality of facets each corresponding to a projection from a camera in the plurality of cameras; receiving video content corresponding to the plurality of cameras; and transmitting the video content and the generated mesh to a user device in response to receiving a request for the video content from the user device.

21 Claims, 4 Drawing Sheets

(51) Int. Cl.
*G06T 7/593* (2017.01)
*H04N 5/232* (2006.01)
*H04N 21/2343* (2011.01)
*H04N 13/128* (2018.01)
*H04N 13/271* (2018.01)
*H04N 13/275* (2018.01)
*H04N 13/194* (2018.01)
*H04N 13/279* (2018.01)
*H04N 13/282* (2018.01)
*H04N 13/296* (2018.01)
*H04N 13/257* (2018.01)
*H04N 13/261* (2018.01)

(52) U.S. Cl.
CPC ......... *H04N 13/279* (2018.05); *H04N 13/282* (2018.05); *H04N 13/296* (2018.05); *H04N 21/2343* (2013.01); *H04N 13/257* (2018.05); *H04N 13/261* (2018.05)

(56) References Cited

U.S. PATENT DOCUMENTS

| | | | |
|---|---|---|---|
| 9,407,904 | B2 | 8/2016 | Sandrew et al. |
| 9,573,062 | B1 | 2/2017 | Long et al. |
| 2007/0211934 | A1 | 9/2007 | Pan et al. |
| 2011/0222757 | A1 | 9/2011 | Yeatman et al. |
| 2013/0204977 | A1* | 8/2013 | Armstrong .............. H04L 65/60 709/219 |
| 2014/0245367 | A1* | 8/2014 | Sasaki ................ H04N 21/4402 725/109 |
| 2015/0042701 | A1 | 2/2015 | Nakata et al. |
| 2015/0062287 | A1* | 3/2015 | Reinhardt ........ H04N 21/23418 348/36 |
| 2015/0249815 | A1* | 9/2015 | Sandrew ............... G06T 15/205 348/47 |
| 2016/0241836 | A1* | 8/2016 | Cole .................... H04N 19/597 |
| 2016/0341826 | A1 | 11/2016 | Gammenthaler et al. |
| 2016/0360180 | A1 | 12/2016 | Cole et al. |
| 2018/0097867 | A1* | 4/2018 | Pang .................... H04N 5/2226 |
| 2018/0160160 | A1* | 6/2018 | Swaminathan .... H04N 21/2662 |
| 2018/0192033 | A1* | 7/2018 | Gallup .................. H04N 5/247 |
| 2018/0357245 | A1* | 12/2018 | Garg ................. G06F 17/30061 |

FOREIGN PATENT DOCUMENTS

| | | |
|---|---|---|
| KR | 20050074260 | 7/2005 |
| NO | 2014024475 | 2/2014 |

OTHER PUBLICATIONS

McCutchen et al., "3DAV Exploration of Video-Based Rendering Technology in MPEG", in IEEE Transactions on Circuits and Systems for Video Technology, vol. 14, No. 3, Mar. 2004, pp. 348-356.

Office Action dated Aug. 27, 2020 in KR Patent Application No. 10-2019-7035944.

Office Action dated Oct. 23, 2020 in CN Patent Application No. 201880037196.8.

Examination Report dated Feb. 1, 2021 in in Patent Application No. 201947048516.

Notice of Allowance dated Feb. 24, 2021 in KR Patent Application No. 10-2019-7035944.

Office Action dated Mar. 22, 2021 in JP Patent Application No. 2019-567351.

* cited by examiner

METHODS, SYSTEMS, AND MEDIA FOR GENERATING AND RENDERING IMMERSIVE VIDEO CONTENT

TECHNICAL FIELD

The disclosed subject matter relates to methods, systems, and media for generating and rendering immersive video content.

BACKGROUND

Many users enjoy viewing immersive video content, such as virtual reality content, three-dimensional content, 180-degree content, or 360-degree content, that can provide a viewer with an immersive experience. Additionally, these users may enjoy viewing computer-generated content in an immersive format, such as gaming videos or animations.

Immersive video content is frequently rendered by applying video content to a mesh, such as a fish-eye mesh or a three-dimensional equirectangular mesh, which causes the video content to be rendered as if it were filling a portion of a sphere rather than as appearing flat. However, rendering computer-generated content using a fish-eye projection or a three-dimensional equirectangular projection can be resource intensive, particularly when rendering graphics in real-time.

Accordingly, it is desirable to provide new methods, systems, and media for generating and rendering immersive video content.

SUMMARY

Methods, systems, and media for generating and rendering immersive video content are provided.

In accordance with some embodiments of the disclosed subject matter, a method for generating immersive video content is provided, the method comprising: receiving information indicating positions of cameras in a plurality of cameras; generating a mesh on which video content is to be projected based on the positions of the cameras in the plurality of cameras, wherein the mesh is comprised of a portion of a faceted cylinder, and wherein the faceted cylinder has a plurality of facets each corresponding to a projection from a camera in the plurality of cameras; receiving video content corresponding to the plurality of cameras; and transmitting the video content and the generated mesh to a user device in response to receiving a request for the video content from the user device.

In some embodiments, generating the mesh comprises stitching the plurality of facets in a side by side orientation.

In some embodiments, the method further comprises inserting the generated mesh into a video file that includes the video content prior to transmitting the video file to the user device.

In some embodiments, the video content includes a depth map.

In some embodiments, the method further comprises converting the generated mesh to a second type of mesh for projecting video content. In some embodiments, the second type of mesh is a fish-eye projection.

In some embodiments, the method further comprises: receiving resulting image information associated with a rendered video content item; and causing an indication to be presented to displace one or more of the plurality of cameras based on the information indicating the positions of cameras in the plurality of cameras.

In accordance with some embodiments of the disclosed subject matter, a system for generating immersive video content is provided, the system comprising a memory and a hardware processor that, when executing computer executable instructions stored in the memory, is configured to: receive information indicating positions of cameras in a plurality of cameras; generate a mesh on which video content is to be projected based on the positions of the cameras in the plurality of cameras, wherein the mesh is comprised of a portion of a faceted cylinder, and wherein the faceted cylinder has a plurality of facets each corresponding to a projection from a camera in the plurality of cameras; receive video content corresponding to the plurality of cameras; and transmit the video content and the generated mesh to a user device in response to receiving a request for the video content from the user device.

In accordance with some embodiments of the disclosed subject matter, a non-transitory computer-readable medium containing computer executable instructions that, when executed by a processor, cause the processor to perform a method for generating immersive video content is provided, the method comprising: receiving information indicating positions of cameras in a plurality of cameras; generating a mesh on which video content is to be projected based on the positions of the cameras in the plurality of cameras, wherein the mesh is comprised of a portion of a faceted cylinder, and wherein the faceted cylinder has a plurality of facets each corresponding to a projection from a camera in the plurality of cameras; receiving video content corresponding to the plurality of cameras; and transmitting the video content and the generated mesh to a user device in response to receiving a request for the video content from the user device.

In accordance with some embodiments of the disclosed subject matter, a system for generating immersive video content is provided, the system comprising: means for receiving information indicating positions of cameras in a plurality of cameras; means for generating a mesh on which video content is to be projected based on the positions of the cameras in the plurality of cameras, wherein the mesh is comprised of a portion of a faceted cylinder, and wherein the faceted cylinder has a plurality of facets each corresponding to a projection from a camera in the plurality of cameras; means for receiving video content corresponding to the plurality of cameras; and means for transmitting the video content and the generated mesh to a user device in response to receiving a request for the video content from the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for generating and rendering immersive video content are provided.

In some embodiments, the mechanisms described herein can receive or generate video content, and can generate a mesh that can be used to render the video content as immersive content on a user device. For example, the mechanisms described herein can generate a mesh that can be used to render the video content as 180-degree video content, which can allow a viewer of the video content to feel immersed in the video content when viewing the video content. As another example, in some embodiments, the mechanisms described herein can generate a mesh that can be used to render the video content as three-dimensional video content with any suitable spatial extent.

In some embodiments, the mechanisms described herein can generate the mesh based on any suitable information associated with one or more cameras generating or recording the video content. For example, in some embodiments, the mechanisms can generate a mesh that includes a group of panels, where each panel corresponds to a field of view from a corresponding group of cameras. In some such embodiments, the panels can be placed in a side-by-side positioning to generate a portion of a faceted cylinder, representing a cumulative field of view of the cameras in the group of cameras, as described below in connection with FIGS. 1A, 1B, and 4. Note that, in some embodiments, the cameras described herein can be cameras used for generating computer-generated (CG) content, such as gaming videos, animations, graphics, and/or any other suitable type of CG content. In some embodiments, the video content can be CG content that is rendered in real-time or in near real-time.

In some embodiments, the video content and the generated mesh can be transmitted to a user device for rendering by the user device. For example, in some embodiments, the generated mesh can be inserted into a video file that includes the video content, and the video file can be transmitted to the user device, as described below in connection with FIG. 5. Additionally or alternatively, in some embodiments, the generated mesh can be used as an intermediary step prior to creating a fish-eye projection of the video content and/or a three-dimensional equirectangular projection of the video content.

In some embodiments, the mechanisms described herein can have the effect of reducing the time needed to render immersive content. In particular, the mechanisms can be used to render CG content, such as animated video and/or visual effects, quickly and efficiently. Additionally, the mechanisms used herein can be used to render immersive content in instances where a rendering application does not support particular types of three-dimensional projection, such as a fish-eye projection or a three-dimension equirectangular projection.

Figure 1A:
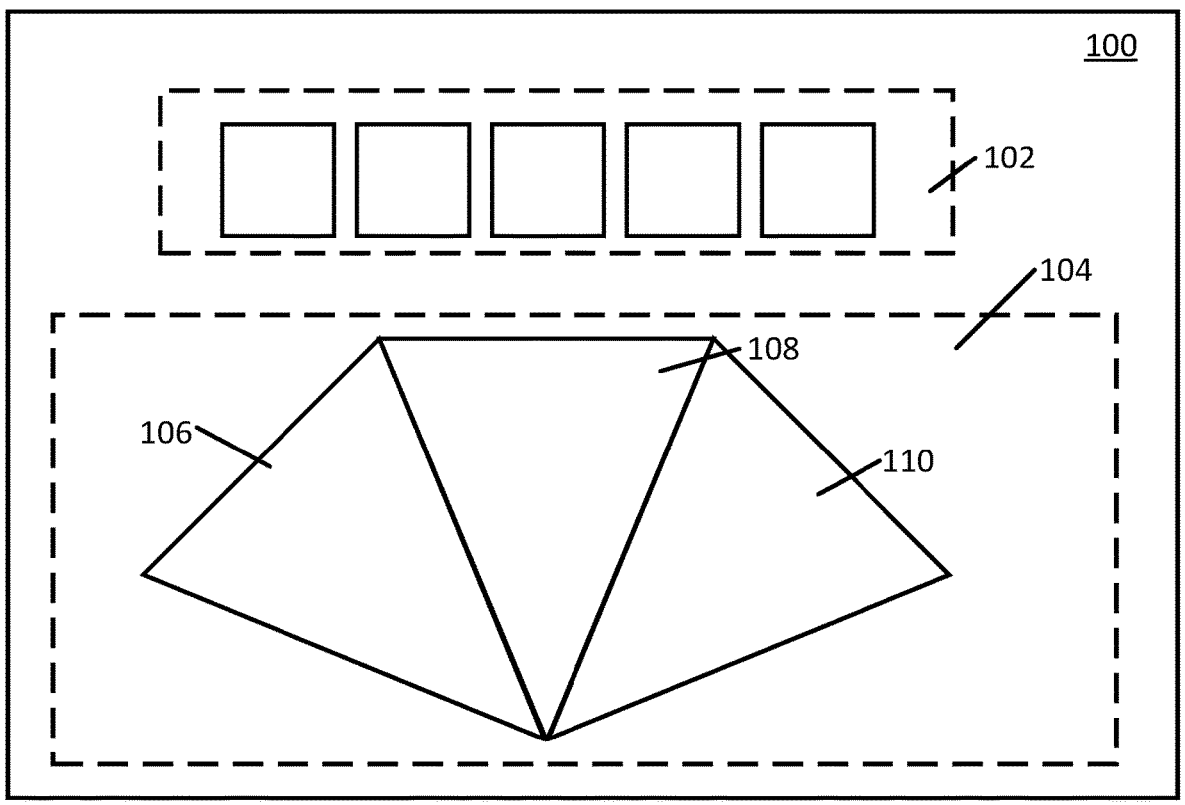
FIGS. 1A and 1B show examples of schematic diagrams for rendering immersive video content in accordance with some embodiments of the disclosed subject matter.

Turning to FIG. 1A, an illustrative example 100 of a schematic diagram for recording and/or generating video content that is to be rendered as immersive video content is shown in accordance with some embodiments of the disclosed subject matter. In some embodiments, the immersive video content can be three-dimensional video content, 180-degree video content, or 360-degree video content that allows a viewer to feel immersed within the video content while viewing the video content by allowing the viewer to manipulate a viewpoint of the video content, and/or any other suitable type of video content. In some embodiments, the video content can be generated by a computer-generated (CG) camera that generates CG video content using any suitable technique or combination of techniques.

As shown in FIG. 1A, a group 104 of any suitable number of cameras (e.g., two, three, and/or any other suitable number) can be used to generate video content 102. In some embodiments, each camera can be associated with a frustum, such as frustums 104, 106, and/or 108, which can represent a field of view of a corresponding camera. In some such embodiments, each of frustums 104-108 can be represented as a pyramid originating from a center of a corresponding camera. Note that, although not illustrated in FIG. 1A, in some embodiments, the cameras can record or generate video content that is to be presented stereoscopically. For example, in some embodiments, a first camera can be located at a first location (e.g., −30 millimeters, and/or at any other suitable location) and a second camera can be located at a second location (e.g., +30 millimeters, and/or at any other suitable location) offset from the first location.

It should be noted that, in some embodiments, location information associated with each camera can be used to calibrate the location and/or orientation associated with each camera. This can, for example, coordinate the placement of a first camera at a first location of −30 millimeters and a second camera at a second location of +30 millimeters to create resulting image information for each eye of a viewer. In a more particular example, two camera rigs, where each camera rig has at least two cameras, can be configured to generate a single output as follows:

LeftCameraRig: pos.x=−0.032 m
LeftCamera: rotation.y=−30°, fov=60°, fill 0% to 25% of the viewport
RightCamera: rotation.y=30°, fov=60°, fill 25% to 50% of the viewport
RightCameraRig: pos.x=+0.032 m
LeftCamera: rotation.y=−30°, fov=60°, fill 50% to 75% of the viewport
RightCamera: rotation.y=30°, fov=60°, fill 75% to 100% of the viewport In some embodiments, an instruction to re-position or otherwise displace one or more cameras by a particular distance can be presented in response to receiving and analyzing the location information associated with each camera.

Figure 1B:
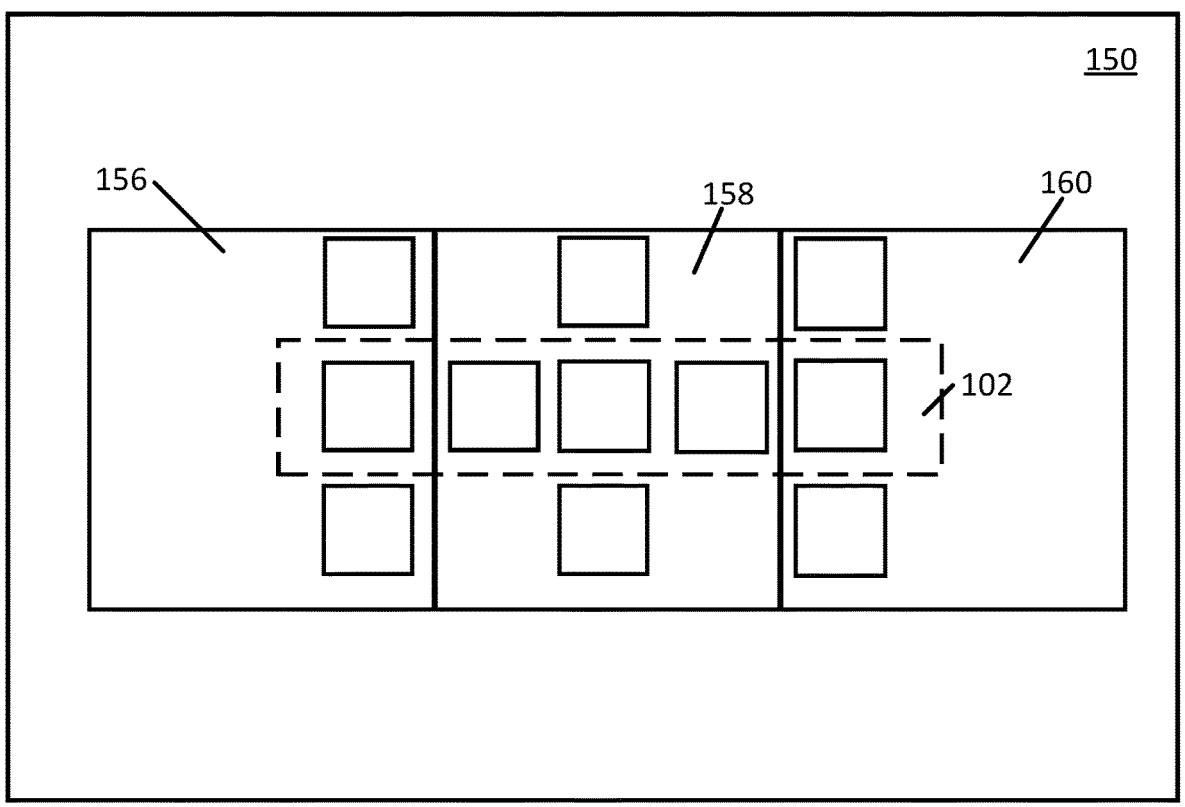

Turning to FIG. 1B, an illustrative example 150 of a schematic diagram for projecting the video content using a mesh based on camera position is shown in accordance with some embodiments of the disclosed subject matter. As illustrated, images created by each camera can be used to create a panel (e.g., panels 156, 158, and/or 160), where each panel spans a field of view corresponding to a field of a view of an associated camera in group 104 of FIG. 1A. For example, in an instance where each camera in group 104 has a horizontal field of view of 50 degrees and is oriented 50 degrees apart, panels 156-160 can each have a field of view of 50 degrees. In some embodiments, panels 156-160 can be located side-by-side, for example, as the sides of a faceted cylinder. In some such embodiments, panels 156-160, which can be located side-by-side, can create a portion of a faceted cylinder having a total field of view that is generally equivalent to the sum of the field of view of each camera in group of cameras 104. For example, in an instance where each camera in group 104 has a horizontal field of view of 50 degrees and where there are three cameras in group 104, panels 156-160 can represent a portion of a faceted cylinder that spans 150 degrees. In some embodiments, panels 156-160 can each represent a plane in three-dimensional space, with any suitable rotation.

Although the embodiments described herein generally relate to a total field of view of a particular number of degrees, such as 180 degrees, this is merely illustrative. It should be noted that, in some embodiments, the total field of view can be an arbitrary value (e.g., 140 degrees, 124 degrees, 250 degrees, etc.). It should also be noted that the vertical field of view and the horizontal field of view can be different values.

It should further be noted that, although the embodiments described herein generally relate to a mesh that can be arranged to represent a faceted cylinder, this is merely illustrative. In some embodiments, a panel in a three-dimensional space can be created for each camera, where the panel corresponds to the frustum of the camera, and these panels can be used for any suitable shape. For example, the shape may not such that the created panels are not touching or combined to form a continuous shape. In a more particular example, four cameras can be configured to face forward and be angled towards a top-left direction, a top-right direction, a bottom-left direction, and a bottom-right direction, where the frustums of the cameras can overlap at a center position. In continuing this example, the corresponding panels that are created for each of these cameras may have edges that overlap in a three-dimensional space while not having edges that touch.

Figure 2:
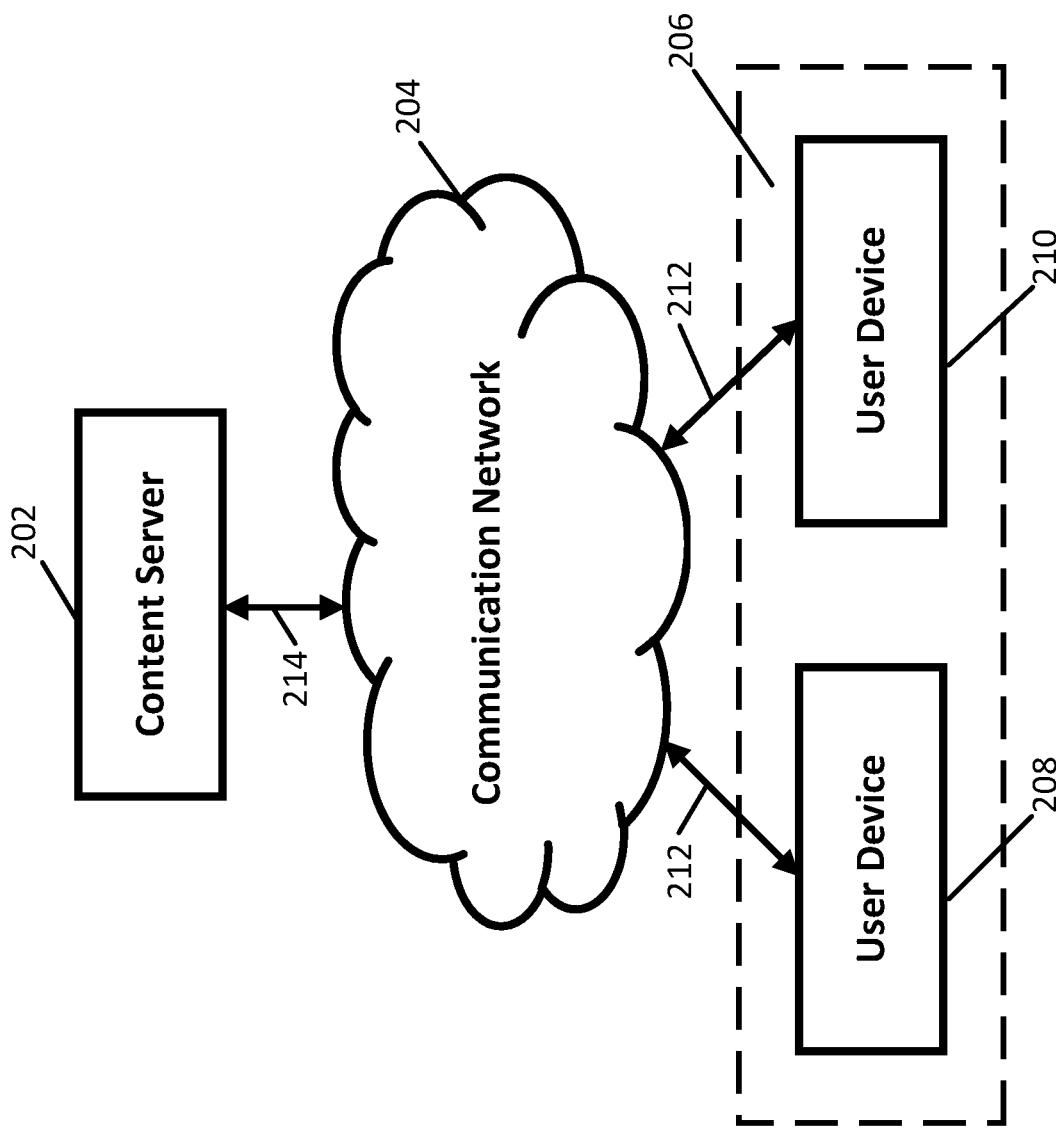
FIG. 2 shows a schematic diagram of an illustrative system suitable for implementation of mechanisms described herein for rendering immersive video content in accordance with some embodiments of the disclosed subject matter.

Turning to FIG. 2, an illustrative example 200 of hardware for rendering immersive video content that can be used in accordance with some embodiments of the disclosed subject matter is shown. As illustrated, hardware 200 can include a content server 202, a communication network 204, and/or one or more user devices 206, such as user devices 208 and 210.

Content server 202 can be any suitable server(s) for storing and/or providing media content to user devices 206. For example, in some embodiments, content server 202 can store media content, such as videos, television programs, movies, live-streamed media content, audio content, animations, video game content, graphics, and/or any other suitable media content. In some embodiments, content server 202 can transmit media content to user devices 306, for example, via communication network 204. In some embodiments, content server 202 can store video content (e.g., live video content, computer-generated video content, and/or any other suitable type of video content) in association with any suitable information to be used by a client device (e.g., user device 206) to render the video content as immersive content, as shown in and described below in connection with FIG. 4.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 212) to communication network 204 that can be linked via one or more communications links (e.g., communications links 214) to content server 202. The communications links can be any communications links suitable for communicating data among user devices 206 and content server 202 such as network links, dial-up links, wireless links, hard-wired links, any other suitable communications links, or any suitable combination of such links.

User devices 206 can include any one or more user devices suitable for requesting video content, rendering the requested video content as immersive video content (e.g., as virtual reality content, as three-dimensional content, as 360-degree video content, as 180-degree video content, and/or in any other suitable manner) and/or for performing any other suitable functions. For example, in some embodiments, user devices 206 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 206 can include a media playback device, such as a television, a projector device, a game console, desktop computer, and/or any other suitable non-mobile device.

Although content server 202 is illustrated as one device, the functions performed by content server 202 can be performed using any suitable number of devices in some embodiments. For example, in some embodiments, multiple devices can be used to implement the functions performed by content server 202.

Although two user devices 208 and 210 are shown in FIG. 2 to avoid over-complicating the figure, any suitable number of user devices, and/or any suitable types of user devices, can be used in some embodiments.

Figure 3:
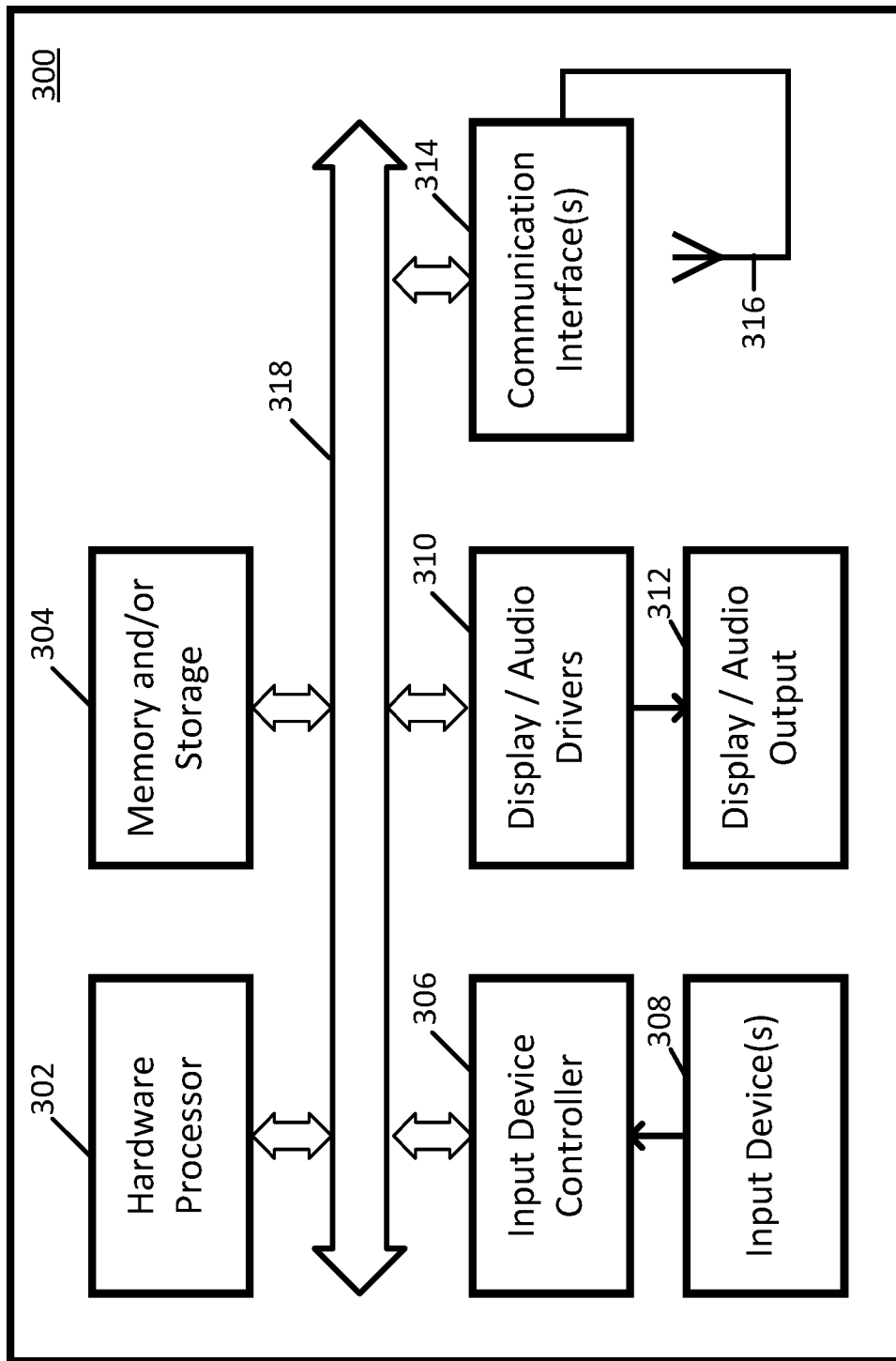
FIG. 3 shows a detailed example of hardware that can be used in a server and/or a user device of FIG. 2 in accordance with some embodiments of the disclosed subject matter.

Content server 202 and user devices 206 can be implemented using any suitable hardware in some embodiments. For example, in some embodiments, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, in some embodiments, the server program can cause hardware processor 302 to transmit a media content item to user device 206, transmit instructions for presenting rendering a video stream as immersive video content, and/or performing any other suitable actions. In some embodiments, hardware processor 302 can be controlled by a computer program stored in memory and/or storage 304 of user device 206. For example, the computer program can cause hardware processor 302 to render a video stream as immersive video content, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
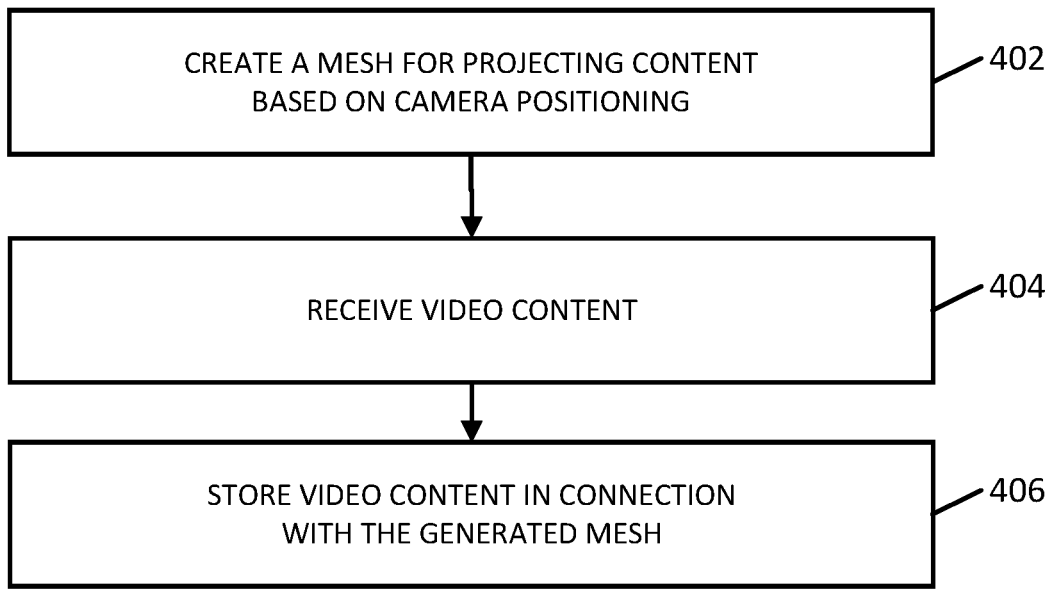
FIG. 4 shows an example of a process for processing video streams to be rendered as immersive content in accordance with some embodiments of the disclosed subject matter.

Turning to FIG. 4, an illustrative example 400 of a process for generating immersive video content is shown in accordance with some embodiments of the disclosed subject matter. In some embodiments, blocks of process 400 can be performed by any suitable device, such as a content server (e.g., content server 202 as shown in and described above in connection with FIG. 2) that stores video content and transmits the stored video content to user devices.

Process 400 can begin by generating a mesh on which video content can be projected at 402. In some embodiments, the mesh can be generated based on a number of cameras used to generate the video content and/or based on positions of the cameras used to generate the video content. For example, in some embodiments, a number of panels included in the mesh can be based on a number of cameras used to record or generate the video content, as shown in and described above in connection with FIGS. 1A and 1B. As another example, in some embodiments, a field of view represented by the mesh can be based on fields of view of the cameras used to record or generate the video content. As a more particular example, in an instance where N cameras each have an X degree horizontal field of view, the horizontal field of view represented by the mesh can be N×X. As a specific example, in an instance where the video content is recorded or generated by 3 cameras each having a 50-degree field of view, the mesh can include three panels each representing a 50-degree field of view. Continuing with this example, in some embodiments, the mesh can include three panels arranged to represent 150 degrees of a faceted cylinder. In some embodiments, the panels of the mesh can be arranged or positioned in any suitable manner, such as placed in a side-by-side orientation. In some embodiments, the panels can have any suitable rotational orientation which can be based an orientation of the cameras used to generate the video content.

Note that, although the generated mesh is generally described herein as representing a portion of a faceted cylinder, in some embodiments, the generated mesh can have any suitable shape. For example, in some embodiments, one or more panels can be arranged in a top-to-bottom orientation, thereby adjusting a vertical field of view. As another example, in some embodiments, panels can be arranged to cause a particular amount of overlap between each adjacent panel.

At 404, process 400 can receive video content or any suitable video information. For example, in some embodiments, process 400 can receive video content from a group (e.g., two, three, and/or any other suitable number) of cameras generating CG content, as described above in connection with block 402. In some embodiments, a camera used to generate video content can be any suitable type of camera. For example, in some embodiments, a camera can be a CG camera that generates video content used in video games, animations, and/or any other suitable type of CG video content using any suitable computer graphics technique(s). Note that, in some embodiments, the video content can be a combination of different types of video content. For example, in some embodiments, process 400 can receive a portion of recorded video content and a portion of CG video content, such as an overlay, a graphic, text, and/or any other suitable type of CG content that is to be superimposed on the recorded video content. As a more particular example, in some embodiments, the portion of CG video can include visual effects, titles, credits, and/or any other suitable content that is to be overlaid on other video content.

In some embodiments, process 400 can receive the video content at any suitable resolution (e.g., 3840×2160, 1920× 2160 per eye for stereoscopic content, and/or at any other suitable resolution). In some embodiments, the received video content can include any suitable depth information. For example, in some embodiments, received CG video content can include a depth map representing a distance of each pixel of the video content. As a more particular example, in some embodiments, the depth map can include different values for pixels of the video content, where each value represents a distance of content of the pixel. In some embodiments, the depth map can be used to render the video content stereoscopically.

Note that, in some embodiments, in instances where the video content is content rendered by a particular application (e.g., an application associated with a game or a gaming console, and/or any other suitable type of application), process 400 can record the rendered content using any suitable technique or combination of techniques. For example, in some embodiments, process 400 can record the video content using an Application Programming Interface (API) associated with the application.

In some embodiments, process 400 can process or manipulate the received video content in any suitable manner. For example, in some embodiments, process 400 can replicate the received video content to generate video content to be rendered stereoscopically. As a more particular example, in some embodiments, process 400 can replicate the received video content to generate two versions of the video content offset by any suitable distance (e.g., 30 millimeters, 60 millimeters, and/or any other suitable offset), where a first version is to be delivered to a left eye of a viewer and a second version is to be delivered to a right eye of the viewer.

Process 400 can store the video content in connection with the generated mesh at 406. For example, in some embodiments, process 400 can store the video content and the generated mesh on a content server, such as content server 202, to be delivered at any suitable time to a user device (e.g., in response to a request from the user device, as described below in connection with FIG. 5). In some embodiments, process 400 can store the video content in connection with the generated mesh in any suitable manner. For example, in some embodiments, any suitable data representing the mesh (e.g., locations of panels of the mesh, sizes of panels of the mesh, orientations of panels of the mesh, and/or any other suitable data) can be inserted into a video file associated with the video content.

Note that, in some embodiments, the mesh generated at block 402 can be used by process 400 as an intermediate step to generating a different mesh to render video content using a spherical projection, such as a fish-eye projection, a cropped equirectangular projection, and/or any other suitable type of projection. For example, the mesh generated at block 402 can be converted into a cropped equirectangular mesh.

Figure 5:
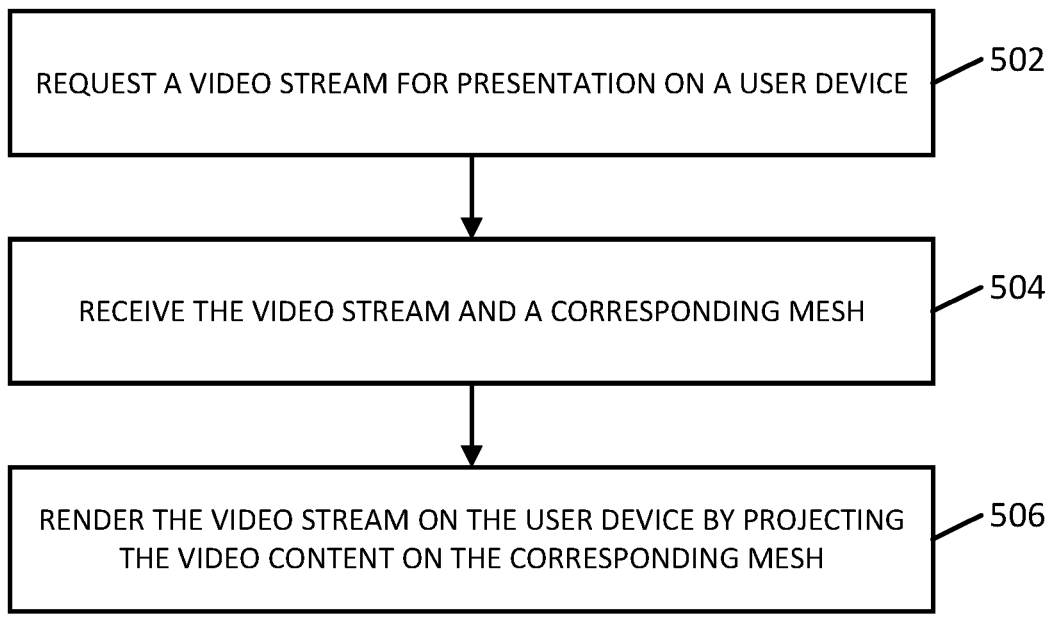
FIG. 5 shows an example of a process for rendering immersive video content in accordance with some embodiments of the disclosed subject matter.

Turning to FIG. 5, an illustrative example 500 of a process for rendering immersive video content is shown in accordance with some embodiments of the disclosed subject matter. In some embodiments, blocks of process 500 can be executed by any suitable device, such as a virtual reality headset, a game console, a mobile phone, a tablet computer, a television, and/or any other suitable type of user device.

Process 500 can begin at 502 by requesting a video stream for presentation on a user device. In some embodiments, the video stream can be any suitable type of video stream, such as a video to be streamed to the user device from a content server, and/or any other suitable type of video stream. In some embodiments, the video stream can be requested on the user device in any suitable manner. For example, in some embodiments, the video stream can be requested in response to a user of the user device selecting the video stream from a page indicating available video content, and/or in any other suitable manner.

Process 500 can receive the video stream and a corresponding mesh to be used to render the video stream at 504. For example, in some embodiments, the video stream and the corresponding mesh can be received from a content server (e.g., content server 202 as shown in and described above in connection with FIG. 2) that stores the video content and/or that generated the mesh, as described above in connection with FIG. 4. In some embodiments, the video stream and the corresponding mesh can be received in any suitable manner. For example, in some embodiments, the mesh can be inserted into a file that includes the video stream, and process 500 can extract the mesh from the file using any suitable technique or combination of techniques. It should be noted that any suitable approach can be used to inject the corresponding mesh into the video stream.

Process 500 can render the video stream on the user device as immersive content at 506 using any suitable technique or combination of techniques. For example, in some embodiments, process 500 can apply or project the video stream onto the mesh to render the video stream as immersive content. As a more particular example, in some embodiments, process 500 can use any suitable technique (e.g., UV mapping, and/or any other suitable technique(s)) for mapping content from the video stream to the mesh as a texture. As another example, in some embodiments, process 500 can render the video stream as stereoscopic content by presenting a first portion of the video stream to a left eye of a viewer of the user device and a second portion of the video stream to a right eye of the viewer of the user device. In some such embodiments, the first portion of the video stream and the second portion of the video stream can be separately applied or projected onto the mesh prior to rendering on the user device.

In some embodiments, process 500 can render the video stream as immersive content that can be manipulated or interacted with by a viewer of the video stream. For example, in some embodiments, process 500 can render the video stream in a manner that can allow a viewer to change a viewpoint of the video stream. As a more particular example, in some embodiments, in instances where the viewer is using a virtual reality headset or other wearable computer, process 500 can change a presented viewpoint of the video stream in response to determining that the viewer has changed an orientation of the viewer's head. As another more particular example, in some embodiments, process 500 can change a presented viewpoint of the video stream in response to determining that the viewer has input a gesture on the user device to manipulate the viewpoint, such as by selecting and dragging a user interface on which the video stream is presented.

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for rendering immersive video content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating immersive video content, comprising:
   receiving information indicating positions of cameras in a plurality of cameras;
   generating a mesh on which video content is to be projected based on the positions of the cameras in the plurality of cameras, wherein the mesh is comprised of a portion of a faceted cylinder, wherein the faceted cylinder has a plurality of facets each corresponding to a projection from a camera in the plurality of cameras, and wherein a total horizontal field of view of the faceted cylinder corresponds to a sum of horizontal fields of view of the cameras in the plurality of cameras;
   causing one or more of the positions of the plurality of cameras to be repositioned such that the projection of the camera overlap with the projection of an adjacent camera by a predetermined overlap amount;
   receiving video content corresponding to the plurality of cameras; and
   transmitting the video content and the generated mesh on which the video content is to be projected to a user device in response to receiving a request for the video content from the user device, wherein the user device is to render the video content by projecting the video content on the generated mesh.

2. The method of claim 1, wherein generating the mesh comprises stitching the plurality of facets in a side by side orientation.

3. The method of claim 1, further comprising inserting the generated mesh into a video file that includes the video content prior to transmitting the video file to the user device.

4. The method of claim 1, wherein the video content includes a depth map.

5. The method of claim 1, further comprising converting the generated mesh to a second type of mesh for projecting video content.

6. The method of claim 5, wherein the second type of mesh is a fish-eye projection.

7. The method of claim 1, further comprising:
   receiving resulting image information associated with a rendered video content item; and
   causing an indication to be presented to displace one or more of the plurality of cameras based on the information indicating the positions of cameras in the plurality of cameras.

8. A system for generating immersive video content, the system comprising:
   a memory; and
   a hardware processor that, when executing computer-executable instructions stored in the memory, is configured to:
   receive information indicating positions of cameras in a plurality of cameras;
   generate a mesh on which video content is to be projected based on the positions of the cameras in the plurality of cameras, wherein the mesh is comprised of a portion of a faceted cylinder, wherein the faceted cylinder has a plurality of facets each corresponding to a projection from a camera in the plurality of cameras, and wherein a total horizontal field of view of the faceted cylinder corresponds to a sum of horizontal fields of view of the cameras in the plurality of cameras;
   cause one or more of the positions of the plurality of cameras to be repositioned such that the projection of the camera overlap with the projection of an adjacent camera by a predetermined overlap amount;
   receive video content corresponding to the plurality of cameras; and
   transmit the video content and the generated mesh on which the video content is to be projected to a user device in response to receiving a request for the video content from the user device, wherein the user device is to render the video content by projecting the video content on the generated mesh.

9. The system of claim 8, wherein generating the mesh comprises stitching the plurality of facets in a side by side orientation.

10. The system of claim 8, wherein the hardware processor is further configured to insert the generated mesh into a video file that includes the video content prior to transmitting the video file to the user device.

11. The system of claim 8, wherein the video content includes a depth map.

12. The system of claim 8, wherein the hardware processor is further configured to convert the generated mesh to a second type of mesh for projecting video content.

13. The system of claim 12, wherein the second type of mesh is a fish-eye projection.

14. The system of claim 8, wherein the hardware processor is further configured to:
   receive resulting image information associated with a rendered video content item; and
   cause an indication to be presented to displace one or more of the plurality of cameras based on the information indicating the positions of cameras in the plurality of cameras.

15. A non-transitory computer-readable medium containing computer executable instructions that, when executed by a processor, cause the processor to perform a method for generating immersive video content, the method comprising:
   receiving information indicating positions of cameras in a plurality of cameras;
   generating a mesh on which video content is to be projected based on the positions of the cameras in the plurality of cameras, wherein the mesh is comprised of a portion of a faceted cylinder, wherein the faceted cylinder has a plurality of facets each corresponding to a projection from a camera in the plurality of cameras, and wherein a total horizontal field of view of the faceted cylinder corresponds to a sum of horizontal fields of view of the cameras in the plurality of cameras;

causing one or more of the positions of the plurality of cameras to be repositioned such that the projection of the camera overlap with the projection of an adjacent camera by a predetermined overlap amount;

receiving video content corresponding to the plurality of cameras; and the video content and the generated mesh on which the video content is to be projected to a user device in response to receiving a request for the video content from the user device, wherein the user device is to render the video content by projecting the video content on the generated mesh.

16. The non-transitory computer-readable medium of claim 15, wherein generating the mesh comprises stitching the plurality of facets in a side by side orientation.

17. The non-transitory computer-readable medium of claim 15, wherein the method further comprises inserting the generated mesh into a video file that includes the video content prior to transmitting the video file to the user device.

18. The non-transitory computer-readable medium of claim 15, wherein the video content includes a depth map.

19. The non-transitory computer-readable medium of claim 15, wherein the method further comprises converting the generated mesh to a second type of mesh for projecting video content.

20. The non-transitory computer-readable medium of claim 19, wherein the second type of mesh is a fish-eye projection.

21. The non-transitory computer-readable medium of claim 15, wherein the method further comprises:
receiving resulting image information associated with a rendered video content item; and
causing an indication to be presented to displace one or more of the plurality of cameras based on the information indicating the positions of cameras in the plurality of cameras.

* * * * *